United States Patent [19]

Takebayashi et al.

[11] Patent Number: 4,634,300

[45] Date of Patent: Jan. 6, 1987

[54] ROTATING MEMBER SUPPORTING APPARATUS

[75] Inventors: Hiroaki Takebayashi, Oosaka; Fujio Harumi, Hirakata; Kiyoshi Nakamura, Yokohama; Koichi Inoue, Tokyo, all of Japan

[73] Assignees: Koyo Seiko Company Limited, Oosaka; Kabushiki Kaisha Toshiba, Kawasaki, both of Japan

[21] Appl. No.: 717,883

[22] Filed: Mar. 29, 1985

[30] Foreign Application Priority Data

Mar. 30, 1984 [JP] Japan .................................. 59-64844

[51] Int. Cl.⁴ .............................................. F16C 19/26
[52] U.S. Cl. .................... 384/548; 384/492; 384/569; 384/907
[58] Field of Search ............... 384/548, 492, 907, 569; 184/6.5

[56] References Cited

U.S. PATENT DOCUMENTS

| | | | |
|---|---|---|---|
| 2,158,156 | 5/1939 | Schröder | 384/492 |
| 2,943,894 | 7/1960 | Brook | 384/564 |
| 3,097,897 | 7/1963 | Taylor | 384/492 |
| 3,212,834 | 10/1965 | Mayer et al. | 384/492 |
| 3,641,990 | 2/1972 | Kinnersly | 184/6.5 |

*Primary Examiner*—Lenard A. Footland
*Attorney, Agent, or Firm*—Cushman, Darby & Cushman

[57] ABSTRACT

A rotating member supporting apparatus has a rotating shaft which is inserted to a bore formed in a support member. A rolling bearing is interposed between the rotating shaft and support member and rotatably supports the rotating shaft. The bearing includes an inner and outer rings which have resistance to heat and corrosion, and a plurality of rolling elements rollably arranged between the inner and outer rings. The rolling elements are formed of ceramic material.

17 Claims, 1 Drawing Figure

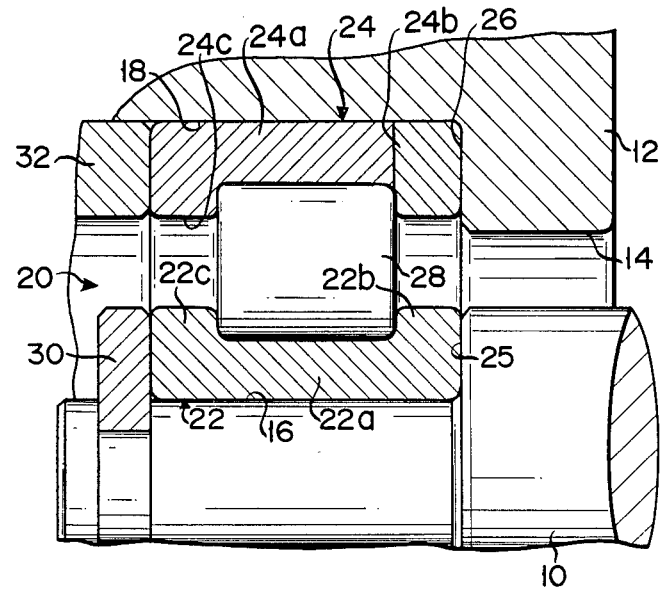

ROTATING MEMBER SUPPORTING APPARATUS

BACKGROUND OF THE INVENTION

The present invention relates to a rotating member supporting apparatus, and more specifically to a supporting apparatus for supporting a rotating member used in a corrosive environment, e.g., a melting furnace for alloy casting, molten-metal plating bath, or electroplating bath.

A conventional melting furnace used in a casting process for aluminum-based alloy or the like, for example, is found on page 11 of the April 1980 issue of the "Kinzoku" (Japanese trade magazine from Agune Co., Ltd.). According to this melting furnace, a fixed shaft extends from the outside of the furnace into a molten alloy in the furnace, and a rotating cylinder with blades at one end thereof is mounted on the fixed shaft with the aid of a bearing. The blades serve to stir the molten alloy for homogenization.

In the melting furnace of this type, however, the rotating blades are placed in the molten alloy, so that the bearing is located in the molten metal if it is disposed between the rotating cylinder and the fixed shaft. Thus, the bearing is left in a corrosive environment, resulting in early-stage decay. Conventionally, therefore, the other end portion of the rotating cylinder extends upward to be located above the surface level of the molten alloy, and the bearing rotatably supports the extended end portion of the rotating cylinder on the fixed shaft. As a result, the distance between those portions of the rotating cylinder corresponding to the bearing and the blades is extended, and the rotating cylinder is shaped like a cantilever supported by the bearing. With this arrangement, the blades whirl while they are rotating, so that stirring efficiency is too low for the molten alloy to be easily homogenized.

For the electroplating bath, a vertical plating bath is generally known which is stated in the "Comprehensive Bibliography of Iron-Making Machines & Equipment, 1977" (issued on Nov. 25, 1976, by Jukogyo Shinbun Publishing Co.). According to this plating bath, a steel plate is guided by a conductor roller and a hold-down roller outside the electroplating bath and a sink roller disposed in an electrolyte in the plating bath. Thus, the surface of the steel plate is plated when the steel plate is energized by a current flowing between an anode bar in the electrolyte and the conductor roller as a cathode. Both end portions of a supporting shaft of the sink roller are fitted in bores in a supporting member at the top end portion of the plating bath. Since the sink roller is rotated at high speed, a bearing is disposed between the roller supporting shaft and the supporting member to protect them against wear.

In this electroplating bath, the sink roller is located in the electrolyte, so that the sink roller and the bearing are always subjected to a corrosive environment. Various measures have conventionally been taken to counter corrosion of the sink roller, including improvement of material. However, no special consideration has been given to the protection of the bearing against corrosion. Therefore, the bearing would possibly be disabled by corrosion in an early stage of use. If the bearing malfunctions, the electroplating apparatus will have to be stopped for the replacement of the bearing, greatly lowering its working efficiency.

SUMMARY OF THE INVENTION

The present invention is contrived in consideration of these circumstances, and is intended to provide a rotating member supporting apparatus highly resistant to heat and corrosion and adapted for use in a corrosive environment.

In order to achieve the above object, a supporting apparatus according to the present invention comprises an outer member having a bore therein, an inner member inserted in the bore and capable of rotation relative to the outer member, one of the outer and inner members constituting a rotating member, and the other constituting a supporting member for supporting the rotating member, and a rolling bearing interposed between the outer and inner members and rotatably supporting the rotating member, the rolling bearing including an inner ring having resistance to heat and corrosion and fitted on the outer peripheral surface of the inner member, an outer ring having resistance to heat and corrosion and fitted in the bore so as to face the inner ring, and a plurality of ceramic rolling elements rollably arranged between the outer peripheral surface of the inner ring and the inner peripheral surface of the outer ring.

BRIEF DESCRIPTION OF THE DRAWING

The accompanying drawing shows a sectional view of a supporting apparatus according to one embodiment of the present invention.

DETAILED DESCRIPTION OF THE PREFERRED EMBODIMENT

One embodiment of the present invention will now be described in detail with reference to the accompanying drawing.

As shown in the drawing, a supporting apparatus is provided with a rotating shaft 10 as an inner member which is used in a corrosive environment. An end portion of the rotating shaft 18 is inserted in a bore 14 which is formed in a supporting member 12 as an outer member. A narrower stepped portion 16 is formed on the end portion of the rotating shaft 10, while a wider stepped portion 18 is formed on the inner peripheral surface of the bore 14, facing the stepped portion 16. A rolling bearing 20 is interposed between the rotating shaft 10 and the inner peripheral surface of the bore 14, whereby the rotating shaft 10 is rotatably supported.

The rolling bearing 20 includes an inner ring 22 and an outer ring 24 which are resistant to both heat and corrosion. The inner ring 22 is fitted on the outer peripheral surface of the narrower stepped portion 16 so as to abut against a shoulder portion 25 of the rotating shaft 10, and is prevented from slipping off the rotating shaft 10 by a locating snap ring 30 which is fitted on the rotating shaft 10. The outer ring 24 is fitted in the wider stepped portion 18 of the bore 14 so as to abut against a shoulder portion 26 of the bore 14, facing the inner ring 22. The outer ring 24 is prevented from slipping off the bore 14 by a fixing sleeve 32 which is fitted in the bore 14. The inner ring 22 is formed of a ring-shaped raceway track portion 22a and rib portions 22b and 22c which are integrally formed at either end of the raceway track portion 22a so as to project radially outward. The outer ring 24 consists of a ring-shaped raceway track portion 24a, a separately formed rib portion 24b located at one end of the raceway track portion 24a on the side of the shoulder portion 26 so as to project radially inward, and a rib portion 24c integrally formed at the other end of the raceway track portion 24a so as to project radially inward.

A plurality of cylindrical rollers 28 made of heat and corrosion resisting ceramic material are arranged in an annular space defined between the respective raceway track portions 22a and 24a of the inner and outer rings 22 and 24. The cylindrical rollers 28 can roll on the outer peripheral surface of the raceway track portion 22a and the inner peripheral surface of the raceway track portion 24a. In rolling action, the cylindrical rollers 28 are guided by the respective inside faces of the rib portions 22b and 22c of the inner ring 22 and the rib portions 24b and 24c of the outer ring 24. Corner portions defined by the raceway track portions 22a and 24a and the rib portions 22b, 22c, 24b and 24c have no grinding undercuts as are provided for conventional bearings, and have a radius of curvature substantially equal to or a little smaller than that of the roller chamfers on the end edges of the cylindrical rollers 28. The cylindrical rollers 28 may be kept at regular intervals along the circumferential direction of the inner ring 22 by a cage (not shown). In this case, the cage is naturally formed from heat and corrosion resisting material, such as stainless steel.

Considering the life of the rolling bearing, the ceramic material for the cylindrical rollers 28 should preferably be selected among silicon nitride, sialon, or silicon carbide which may be formed by a pressure sintering method, such as a hot pressing process, hot isostatic pressing process, or ambient pressure sintering process. When using a sintered compact of silicon nitride for the material, in particular, it is preferably admixed with oxides of rare-earth elements as sintering assistants, preferably yttria, and aluminum oxide, if necessary, at an addition rate of 10% for each. If necessary, moreover, the degree of sintering may effectively be improved by adding 10% or less aluminum nitride or a suitable amount of, preferably 5% or less, titanium oxide, zirconium oxide, magnesium oxide, molybdenum carbide, spinel, and garnet. When using silicon carbide, on the other hand, boron, carbon, aluminum, or a compound of any of these individual elements is preferably added for the improvement of the degree of sintering.

When the supporting apparatus of this embodiment is used in a corrosive environment at a relatively low temperature, e.g., in a melting furnace or electroplating bath for lead or zinc-based alloy, it is necessary only that the cylindrical rollers 28 alone be formed from ceramic material. In other words, the inner and outer rings 22 and 24 may be formed from stainless steel or other corrosion resisting metal, since the environment is not very corrosive.

When using the supporting apparatus in a highly corrosive environment irrespective of temperature, e.g., in a melting furnace or electroplating bath for aluminum-based alloy, however, the inner and outer rings 22 and 24, as well as the cylindrical rollers 28, should preferably be formed from ceramic material. When the supporting apparatus is used in a zinc-based alloy melting furnace, for example, the inner and outer rings 22 and 24 may be formed from conventional bearing steel coated with a corrosion resisting film, such as carbide of vanadium or compound of chromium, for example $Cr_2O_3$.

The ceramic material used for the inner and outer rings 22 and 24 is identical with that for the cylindrical rollers 28. When the ceramic inner and outer rings are used, the inner ring 22 is fitted on the rotating shaft 10 by a proper loose fit, while the outer ring 24 is set in the bore 14 in the supporting member 12 by a tight fit. This is done because ceramics are lower in thermal expansion coefficient than metals, and are more resistant to compressive force but less resistant to tensile force. If the inner ring 22 should be tightly fit on the rotating shaft 10, it would possibly be damaged by a radial tensile force caused by thermal expansion of the rotating shaft 10 during use. It is to be desired therefore that the inner ring 22 and the rotating shaft 10 should be coupled by a loose fit. On the other hand, if the outer ring 24 is fitted more tightly in the bore 14 of the supporting member 12, the fitness will be able to be maintained more satisfactorily in proportion after thermal expansion of the supporting member 12 during use. In practice, however, the outer ring 24, made of fragile ceramic material, may possibly be broken when it is pressed in the bore 14. Accordingly, the outer ring 24 is preferably set in place by a tight fit which permits minimization of the influences of the fitting force and the thermal expansion of the supporting member 12.

If only the cylindrical rollers 28 are formed from ceramic material, the influences of the thermal expansion of the rotating shaft 10 and the supporting member 12 will be able to be avoided.

In the embodiment described above, the inner member serves as the rotating member 10, and the outer member as the supporting member 12 supporting the rotating member 10. Alternatively, the inner and outer members may be constructed as a supporting shaft and a rotating member supported by the supporting shaft, respectively. In other words, it is necessary only that the inner and outer members 10 and 12 be coupled for relative rotation so that one of them serves as a rotating member and the other as a nonrotating member for supporting the rotating member. Here it is to be understood that the manner of arrangement of the rolling bearing according to the above embodiment may also be applied to the case where the inner and outer members constitute the supporting shaft and the rotating member, respectively.

According to the rotating member supporting apparatus constructed in this manner, at least the rolling elements of the rolling bearing are made of ceramic material, while the inner and outer rings are formed of material resistant to heat and corrosion, e.g., metal coated with a corrosion resisting film such as carbide of vanadium or compound of chromium, or ceramic material, as required. Thus, the supporting apparatus of the present invention is higher in heat and corrosion resistance than a prior art counterpart, and can avoid damage to the bearing by corrosion even when used in a corrosive environment at high or low temperature, thereby prolonging the life of the bearing.

When the above-described supporting apparatus is used in, for example, a melting furnace, the inner member 10 serves as a fixed shaft, while the outer member 12 constitutes a rotating cylinder rotatably supported on the fixed shaft. The outer member 12 is fitted with blades for stirring the molten metal. Since the supporting apparatus is highly resistant to corrosion, the rotating cylinder need not be extended above the surface level of the molten metal, and the rotating cylinder and the blades can be supported on substantially the same level by the bearing. Thus, the blades can rotate with less whirling action, and the stirring efficiency is improved for the ease of homogenization of the molten metal.

When the supporting apparatus is used in an electroplating bath, the inner and outer members 10 and 12 constitute a rotating roller and a supporting member for supporting the same, respectively. In this case, the outer member 12 and the bearing 20 are provided at each end of the rotating roller.

When the supporting apparatus is thus applied to the electroplating bath, the life of the bearing can be longer, permitting reduction of the frequency of its replacement. Thus, time loss attributed to the replacement of the bearing can greatly be reduced for improved working efficiency of the plating apparatus.

What is claimed is:

1. A rotating member supporting apparatus comprising:
   an outer member having a bore therein;
   an inner member inserted in the bore and capable of rotation relative to the outer member, one of said outer and inner members constituting a rotating member, and the other constituting a supporting member for supporting the rotating member; and
   a rolling bearing interposed between the outer and inner members and rotatably supporting the rotating member, said rolling bearing including an inner ring having resistance to heat and corrosion and fitted on the outer peripheral surface of the inner member, an outer ring having resistance to heat and corrosion and fitted in the bore so as to face the inner ring, wherein said inner and outer rings are each formed of a metal ring coated with a corrosion resisting film of carbide of vanadium or compound of chromium, and a plurality of ceramic rolling elements rollably arranged between the outer peripheral surface of the inner ring and the inner peripheral surface of the outer ring.

2. A rotating member supporting apparatus comprising:
   an outer member having a bore therein;
   an inner member inserted in the bore and capable of rotation relative to the outer member, one of said outer and inner members constituting a rotating member, and the other constituting a supporting member for supporting the rotating member; and
   a rolling bearing interposed between the outer and inner members and rotatably supporting the rotating member, said rolling bearing including an inner ring having resistance to heat and corrosion and fitted on the outer peripheral surface of the inner member, an outer ring having resistance to heat and corrosion and fitted in the bore so as to face the inner ring, and a plurality of ceramic rolling elements formed of a sintered compact mainly composed of silicon nitride admixed with rare-earth compounds and rollably arranged between the outer peripheral surface of the inner ring and the inner peripheral surface of the outer ring.

3. The supporting apparatus according to claim 2, wherein said rare-earth compounds include yttria.

4. A rotating member supporting apparatus comprising:
   an outer member having a bore therein;
   an inner member inserted in the bore and capable of rotation relative to the outer member, one of said outer and inner members constituting a rotating member, and the other constituting a supporting member for supporting the rotating member; and
   a rolling bearing interposed between the outer and inner members and rotatably supporting the rotating member, said rolling bearing including an inner ring having resistance to heat and corrosion and fitted on the outer peripheral surface of the inner member, an outer ring having resistance to heat and corrosion and fitted in the bore so as to face the inner ring, and a plurality of ceramic rolling elements rollably arranged between the outer peripheral surface of the inner ring and the inner peripheral surface of the outer ring, wherein said rolling elements are formed of a sintered compact mainly composed of silicon nitride admixed with rare-earth compounds and aluminum oxide.

5. A rotating member supporting apparatus comprising:
   an outer member having a bore therein;
   an inner member inserted in the bore and capable of rotation relative to the outer member, one of said outer and inner members constituting a rotating member, and the other constituting a supporting member for supporting the rotating member; and
   a rolling bearing interposed between the outer and inner members and rotatably supporting the rotating member, said rolling bearing including an inner ring formed of a ceramic material and loosely fitted on the outer peripheral surface of the inner member, an outer ring formed of a ceramic material and tightly fitted in the bore of the outer member so as to face the inner ring, and a plurality of rolling elements formed of a ceramic material and rollably arranged between the outer peripheral surface of the inner ring and the inner peripheral surface of the outer ring;
   wherein said ceramic material is a sintered compact mainly composed of silicon nitride admixed with rare-earth compounds.

6. The supporting apparatus according to claim 5, wherein said rare-earth compounds include yttria.

7. The supporting apparatus according to claim 5, wherein said ceramic material is a sintered compact mainly composed of silicon nitride admixed with rare-earth compounds and aluminum oxide.

8. The supporting apparatus according to claim 5 wherein said rolling elements are rollers.

9. A rotating member supporting apparatus comprising:
   an outer member having a bore therein;
   an inner member inserted in the bore and capable of rotation relative to the outer member, one of said outer and inner members constituting a rotating member, and the other constituting a supporting member for supporting the rotating member; and
   a rolling bearing interposed between the outer and inner members and rotatably supporting the rotating member, said rolling bearing including an inner ring fitted on the outer peripheral surface of the inner member, an outer ring fitted in the bore so as to face the inner ring, and a plurality of ceramic rolling elements rollably arranged between the outer peripheral surface of the inner ring and the inner peripheral surface of the outer ring;
   wherein said inner and outer rings are each formed of a metal ring coated with carbide of vanadium or compound of chromium over the entire surface.

10. The supporting apparatus according to claim 9, wherein said rolling elements are rollers.

11. The supporting apparatus according to claim 9, wherein said rolling elements are formed of a sintered compact mainly composed of silicon nitride.

12. The supporting apparatus according to claim 9, wherein said rolling elements are formed of a sintered compact mainly composed of silicon nitride admixed with rare-earth compounds.

13. The supporting apparatus according to claim 12, wherein said rare-earth compounds include yttria.

14. The supporting apparatus according to claim 9, wherein said rolling elements are formed of a sintered compact mainly composed of silicon nitride admixed with rare-earth compounds and aluminum oxide.

15. The supporting apparatus according to claim 9, wherein said rolling elements are formed of a sintered compact mainly composed of silicon carbide.

16. A rotating member supporting apparatus comprising:

an outer member having a bore therein;

an inner member inserted in the bore and capable of rotation relative to the outer member, one of said outer and inner members constituting a rotating member, and the other constituting a supporting member for supporting the rotating member; and a rolling bearing interposed between the outer and inner members and rotatably supporting the rotating member, said rolling bearing including an inner ring formed of a ceramic material and loosely fitted on the outer peripheral surface of the inner member, an outer ring formed of a ceramic material and tightly fitted in the bore of the outer member so as to face the inner ring, and a plurality of ceramic rolling elements rollably arranged between the outer peripheral surface of the inner ring and the inner peripheral surface of the outer ring;

wherein said ceramic material is a sintered compact mainly composed on silicon nitride.

17. A rotating member supporting apparatus comprising:

an outer member having a bore therein;

an inner member inserted in the bore and capable of rotation relative to the outer member, one of said outer and inner members constituting a rotating member, and the other constituting a supporting member for supporting the rotating member; and a rolling bearing interposed between the outer and inner members and rotatably supporting the rotating member, said rolling bearing including an inner ring formed of a ceramic material and loosely fitted on the outer peripheral surface of the inner member, an outer ring formed of a ceramic material and tightly fitted in the bore of the outer member so as to face the inner ring, and a plurality of ceramic rolling elements rollably arranged between the outer peripheral surface of the inner ring and the inner peripheral surface of the outer ring;

wherein said ceramic material is a sintered compact mainly composed of silicon carbide.

* * * * *

REEXAMINATION CERTIFICATE (2010th)
United States Patent [19]
Takebayashi et al.

[11] B1 4,634,300
[45] Certificate Issued  May 18, 1993

[54] ROTATING MEMBER SUPPORTING APPARATUS

[75] Inventors: Hiroaki Takebayashi, Oosaka; Fujio Harumi, Hirakata; Kiyoshi Nakamura, Yokohama; Koichi Inoue, Tokyo, all of Japan

[73] Assignees: Koyo Seiko Company Limited, Osaka; Kabushiki Kaisha Toshiba, Kawasaki, both of Japan

Reexamination Request:
No. 90/002,188, Oct. 31, 1990

Reexamination Certificate for:
Patent No.: 4,634,300
Issued: Jan. 6, 1987
Appl. No.: 717,883
Filed: Mar. 29, 1985

[30] Foreign Application Priority Data

Mar. 30, 1984 [JP] Japan ................................ 59-64844

[51] Int. Cl.$^5$ ............................................. F16C 19/26
[52] U.S. Cl. .................................. 384/548; 384/492; 384/569; 384/907
[58] Field of Search ............... 384/548, 492, 907, 569; 184/6.5

[56] References Cited

U.S. PATENT DOCUMENTS 2,158,156  5/1939  Schroder .
2,943,894  7/1960  Brook .
3,212,834  10/1965  Mayer et al. .
3,641,990  2/1972  Kinnersly .

OTHER PUBLICATIONS

"Lightweight Materials for Rolling Elements in Aircraft Bearings", by Cundill et al., issued in 1982.
"Sintering, Properties and Fabrication of $Si_3N_4+Y_2O_3$ Based Ceramics", by Quackenbush et al., 1983 Martinus Nijhoff Publishers.
"Operation of an All–Ceramic Mainshaft Roller Bearing in a J-402 Gas-Turbine Engine", Hamburg et al. vol. 37, 7, pp. 407–415, Lubrication Engineering 1980.
Influence of Various Densifying Additives on Hot–Pressed $Si_3N_4$, I. C. Huseby and G. Petzow, British Iron and Steel Industry Magazine, 1974.
Silicon Nitride Rolling Bearings for Extreme Operating Conditions, Bharat Bhushan and Lewis B. Sibley, ASLE Transactions, vol. 25, 4, pp. 417–428 (1981).
High Strength Hot-Pressed $Si_3N_4$ with Concurrent $Y_2O_3$ and $Ai_2O_3$ Additions, Akihiko Tsuge and Katsutoshi Nishida, American Ceramic Soceity Bulletin, vol. 57 [4] pp. 424–431 (1978).
Silicon Nitride in Rolling Contact Bearings, H. R. Baumgartner and P. E. Cowley, (1975).
Alternate Ceramic Materials for Roller Bearings, Teledyne CAE, (1984).

*Primary Examiner*—Lenard A. Footland

[57] ABSTRACT

A rotating member supporting apparatus has a rotating shaft which is inserted to a bore formed in a support member. A rolling bearing is interposed between the rotating shaft and support member and rotatably supports the rotating shaft. The bearing includes an inner and outer rings which have resistance to heat and corrosion, and a plurality of rolling elements rollably arranged between the inner and outer rings. The rolling elements are formed of ceramic material.

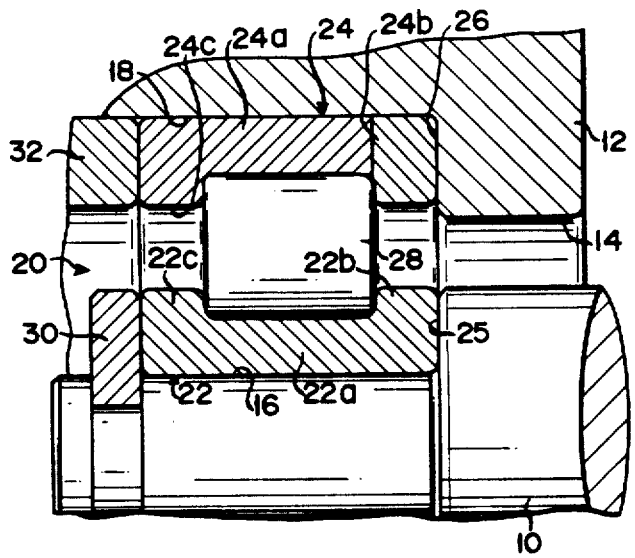

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 5-17 is confirmed.

Claims 2-4 are cancelled.

New claims 18, 19, 20 are added and determined to be patentable.

*18. The supporting apparatus according to claim 5, wherein said silicon nitride is admixed with aluminum oxide.*

*19. A rotating member supporting apparatus comprising: an outer member having a bore therein; an inner member inserted in the bore and capable of rotation relative to the outer member, one of said outer and inner members constituting a rotating member, and the other constituting a supporting member for supporting the rotating member; and a rolling bearing interposed between the outer and inner members and rotatably supporting the rotating member, said rolling bearing including an inner ring having resistance to heat and corrosion and fitted on the outer peripheral surface of the inner member, an outer ring having resistance to heat and corrosion and fitted in the bore so as to face the inner ring, and a plurality of ceramic rolling elements rollably arranged between the outer peripheral surface of the inner ring and the inner peripheral surface of the outer ring, wherein said rolling elements are formed of a sintered compact mainly composed of silicon nitride admixed with rare-earth compounds and aluminum nitride.*

*20. A rotating member supporting apparatus for a melting furnace comprising: an outer member having a bore therein; an inner member inserted in the bore and capable of rotation relative to the outer member, one of said outer and inner members constituting a rotating member, and the other constituting a supporting member for supporting the rotating member; and roller bearing interposed between the outer and inner members and rotatably supporting the rotating member, said roller bearing including an inner ring having resistance to heat and corrosion and fitted on the outer peripheral surface of the inner member, an outer ring having resistance to heat and corrosion and fitted in the bore so as to face the inner ring, and a plurality of ceramic rollers formed of a sintered compact mainly composed of silicon nitride admixed with aluminum nitride and with rare-earth compounds and rollably arranged between the outer peripheral surface of the inner ring and the inner peripheral surface of the outer ring.*

* * * * *